(12) United States Patent
Lee

(10) Patent No.: US 11,267,195 B2
(45) Date of Patent: Mar. 8, 2022

(54) THREE-DIMENSIONAL PRINTER INCLUDING LIGHT EXPOSURE SYSTEM FOR LARGE SCREEN DIVIDED INTO MULTIPLE SCREENS

(71) Applicant: CARIMA CO., LTD., Seoul (KR)

(72) Inventor: Byung-keuk Lee, Seoul (KR)

(73) Assignee: CARIMA CO., LTD, Seoul (KR)

( * ) Notice: Subject to any disclaimer, the term of this patent is extended or adjusted under 35 U.S.C. 154(b) by 0 days.

(21) Appl. No.: 16/123,013

(22) Filed: Sep. 6, 2018

(65) Prior Publication Data

US 2019/0001551 A1 Jan. 3, 2019

Related U.S. Application Data

(63) Continuation of application No. PCT/KR2018/001088, filed on Jan. 24, 2018.

(30) Foreign Application Priority Data

Jan. 24, 2017 (KR) .................. 10-2017-0010847

(51) Int. Cl.
*B29C 64/277* (2017.01)
*B29C 64/129* (2017.01)
(Continued)

(52) U.S. Cl.
CPC .......... *B29C 64/129* (2017.08); *B29C 64/245* (2017.08); *B29C 64/277* (2017.08);
(Continued)

(58) Field of Classification Search
CPC ... B29C 64/135; B29C 64/129; B29C 64/124; B29C 64/277; B29C 64/20; B29C 64/264; B29C 35/08; G06F 19/00; B33Y 30/00
See application file for complete search history.

(56) References Cited

U.S. PATENT DOCUMENTS

2010/0125356 A1* 5/2010 Shkolnik ................. G06T 5/006
700/98
2012/0313294 A1 12/2012 Vermeer et al.
(Continued)

FOREIGN PATENT DOCUMENTS

KR 10-2005-0108952 A 11/2005
KR 10-2010-0080298 * 7/2010 ........... B29C 64/135
(Continued)

OTHER PUBLICATIONS

International Search Report (PCT/KR2018/001088), WIPO, dated May 23, 2018.

*Primary Examiner* — Cedrick S Williams
(74) *Attorney, Agent, or Firm* — Sughrue Mion, PLLC

(57) ABSTRACT

The present invention relates to a 3D printer with an exposure system for a large-scale screen. The 3D printer of the present invention comprises a resin tank configured to be filled with liquid resin; a build platform configured to be immersed in the resin tank or positioned on a surface of the resin tank to form a building plane, and make the liquid resin be cured and stacked on the building plane; a build-platform driver configured to drive the build platform to move up and down; an exposure system configured to project an image beam toward the building plane; and a controller configured to generate a layered unit image from shape information about a building object, split the layered unit image into a plurality of split images, and provides the plurality of split images to the exposure system with time differences, wherein the exposure system receives the plurality of split images from the controller and projects a plurality of split image beams with time differences, and the plurality of split image beams is made into the image beam by a plurality of split screens with time differences and projected to the building plane. The present invention provides a 3D printer which employs one optical engine to form a large-scale (Continued)

screen, thereby having a simpler structure and costing less than a system using a plurality of optical engines.

6 Claims, 7 Drawing Sheets

(51) Int. Cl.
    *B33Y 30/00*     (2015.01)
    *B29C 64/245*     (2017.01)
    *G02B 27/00*     (2006.01)
    *B29C 64/386*     (2017.01)
    *G02B 26/10*     (2006.01)
    *B33Y 10/00*     (2015.01)

(52) U.S. Cl.
    CPC ............ *B29C 64/386* (2017.08); *B33Y 10/00* (2014.12); *B33Y 30/00* (2014.12); *G02B 26/10* (2013.01); *G02B 27/00* (2013.01)

(56) References Cited

U.S. PATENT DOCUMENTS

2017/0151718 A1*   6/2017   Rolland ................ B29C 64/135
2019/0315051 A1*  10/2019   Stadlmann ............ G03F 7/0037

FOREIGN PATENT DOCUMENTS

| KR | 10-2010-0080298 A | 7/2010 |
| KR | 10-2010-0104261 A | 9/2010 |
| KR | 10-2015-0108532 A | 9/2015 |

\* cited by examiner (FIRST STEP)

(SECOND STEP)

THREE-DIMENSIONAL PRINTER INCLUDING LIGHT EXPOSURE SYSTEM FOR LARGE SCREEN DIVIDED INTO MULTIPLE SCREENS

REFERENCE TO RELATED APPLICATIONS

This is a continuation of International Patent Application PCT/KR2018/001088 filed on Jan. 24, 2018, which designates the United States and claims priority of Korean Patent Application No. 10-2017-0010847 filed on Jan. 24, 2017, the entire contents of which are incorporated herein by reference.

FIELD OF THE INVENTION

The present invention relates to a 3D printer with a large-scale screen exposure system. More particularly, the present invention relates to a 3D printer which employs a single optical engine to construct a plurality of exposure systems for a large-scale screen and uses the large-scale screen exposure system to build the large-scale object.

BACKGROUND OF THE INVENTION

Using a large-scale screen exposure system, it is possible to build a large-scale object since the exposure system corresponding to a unit cross-sectional area of a sculpture has a large screen.

However, in a case of a digital light processing (DLP) 3D printer among conventional photocurable 3D printers, a plurality of optical engines are assembled on a plane into a single large-scale screen, thereby constructing the large-scale screen exposure system. In other words, a plurality of basic-sized screens, each of which can be generated by one optical engine, are widthwise or lengthwise coupled on a plane to thereby form a large-scale screen.

Such a conventional large-scale screen exposure system is complicated and requires high investment costs since precision optoelectronic parts, i.e. a plurality of optical engines are used in the exposure system.

SUMMARY OF THE INVENTION

An object of the present invention is to provide a 3D printer which is small and lightweight and prints out a large-scale printed matter with high quality since a single optical engine is employed for constructing a large-scale screen exposure system. The present invention is based on a principle that simultaneous exposures is not necessary for individual large-scale screens in a DLP 3D printer Therefore, the single optical engine is used with a time lag and combined on a plane to thereby construct the large-scale screen exposure system.

According to one aspect of the present invention, a 3D printer comprises: a resin tank configured to be filled with liquid resin; a build platform configured to be immersed in the resin tank or positioned on a surface of the resin tank to form a building plane, and make the liquid resin be cured and stacked on the building plane; a build-platform driver configured to drive the build platform to move up and down; an exposure system configured to project an image beam toward the building plane; and a controller configured to generate a layered unit image from shape information about a building object, split the layered unit image into a plurality of split images, and provides the plurality of split images to the exposure system with time differences, wherein the exposure system receives the plurality of split images from the controller and projects a plurality of split image beams with time differences, and the plurality of split image beams is made into the image beam by a plurality of split screens with time differences and projected to the building plane. The present invention employs one optical engine and the exposure system having the reflection mirror and the reflection mirror driver, and makes the plurality of split screens given with time differences be combined in the plural form, thereby configuring a large-scale screen exposure system.

The exposure system may comprise an optical engine, a reflection mirror, and a reflection mirror driver; the optical engine may receive the plurality of split images from the controller and project the plurality of split image beams with time differences; the reflection mirror may reflect the plurality of split image beams of the optical engine; the controller may transmit a control signal corresponding to the plurality of split images to the reflection mirror driver; the reflection mirror driver changes a reflection position of the reflection mirror into a plurality of different positions in response to the control signal, so that the plurality of split image beams reflected from the reflection mirror are projected as the image beam to the building plane by the plurality of split screens with the time differences.

The controller may revise a distortion of the plurality of split screens, make the plurality of split screens projected on the building plane be partially overlapped with one another, and provide the plurality of split images to the optical engine after adjusting a brightness level for an overlapped area to be lower than a brightness level for a non-overlapped area in the plurality of split screens.

The controller may control a process of providing the plurality of split images to the optical engine with time differences to be repeated a plurality of times to form the unit image of one layer.

The present invention provides a 3D printer which employs a single optical engine and an exposure system having a reflection mirror and a reflection mirror driver, and performs exposure so that the plurality of split screens can be made into one large-scale screen with time differences, thereby providing a small and lightweight large-scale screen exposure system, and building a large-scale object through the large-scale screen exposure system.

DETAILED DESCRIPTION OF THE INVENTION

Embodiments of the present invention will be described in detail with reference to accompanying drawings. The features and merits of the present invention will become apparent from preferable embodiments according to the accompanying drawings.

Figure 1:
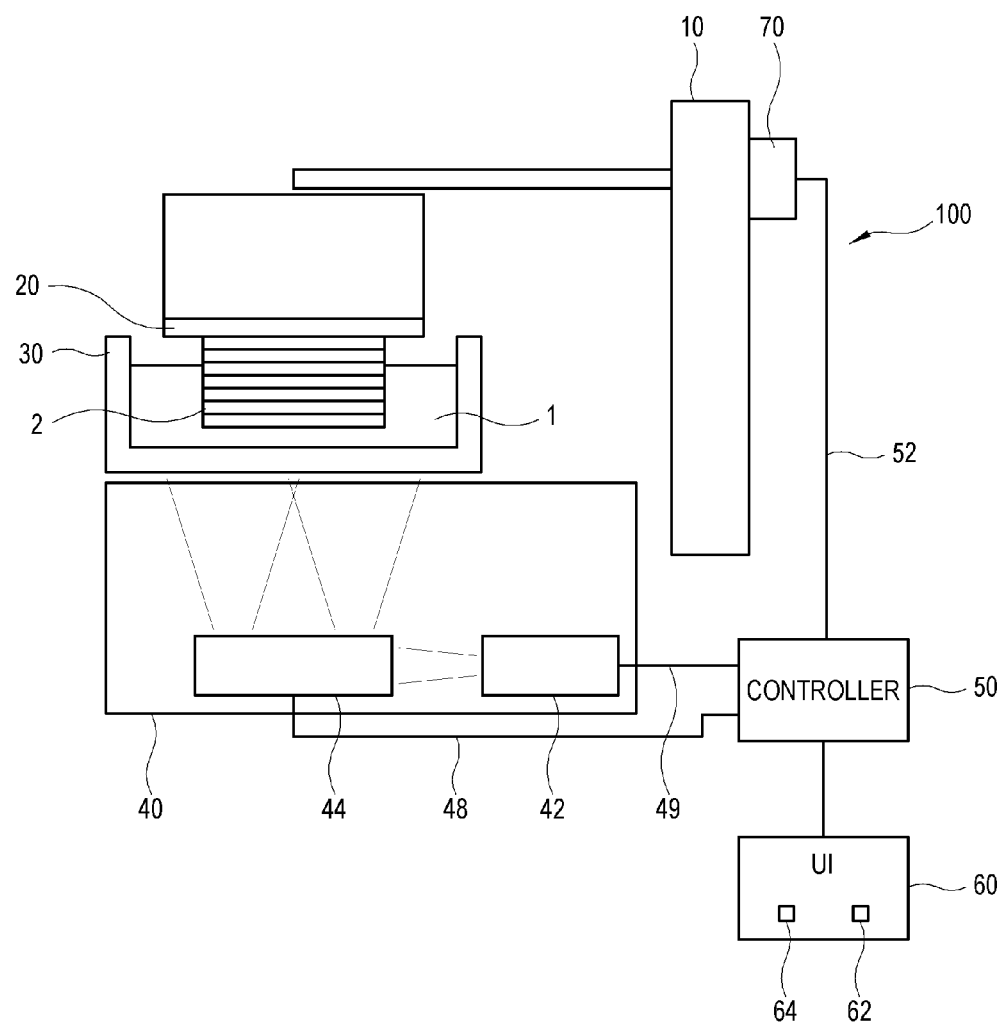
FIG. 1 is a block diagram of a 3D printer with a large-scale screen exposure system according to the present invention.

FIG. 1 is a block diagram of a 3D printer with a large-scale screen exposure system according to the present invention.

A 3D printer 100 according to the present invention includes a large-scale screen exposure system 40. The large-scale screen exposure system 40 can use a large-scale resin tank 30 and build a large-scale sculpture 2 because a screen much larger than that of a general exposure system is employed in exposure.

The large-scale resin tank 30 is filled with liquid resin 1. The liquid resin 1 is subjected to a photo-curing reaction with respect to an exposure image from the large-scale screen exposure system 40. The photo-cured liquid resin 1 is cured into a solid state and attached to a build platform 20, and thus the large-scale sculpture 2 is formed by the photo-cured solid resin stacked in sequence under the build platform 20.

A controller 50 transmits a control signal to a driving motor 70 and a build-platform driver 10 through a build-platform driver control signal line 52.

When the driving motor 70 and the build-platform driver 10 are operated for control, the build platform 20 connected to the build-platform driver 10 also moves up or down with respect to the large-scale resin tank 30.

The controller 50 transmits a control signal to an optical engine 42 and a reflection mirror driver 46 (see FIG. 2) of a screen splitter 44 or to a plurality of optical engines through an optical engine control signal line 49 and a reflection mirror control signal line 48.

An embodiment of using the plurality of optical engines will be described with reference to FIGS. 5A to 6B. The present invention is construed as including a case of using the plurality of optical engines without being limited to the number of optical engines.

The optical engine 42 refers to a kind of exposure system that splits one unit image into four split images to be subjected to exposure on respective split screens 47a~47d with a time lag.

The screen splitter 44 interworks with the control of the optical engine 42 and reflects four split images in sequence with a time lag on to an exposure plane. On the exposure plane, the split exposure images are combined one another to form one large-scale screen exposure image temporally delayed manner.

When the sculpture 2 moves up, a transparent bottom plate of the large-scale resin tank 30 is used as the exposure plane. On the other hand, when the sculpture 2 is immersed down from a top surface of the resin tank into the resin tank, the top of the liquid resin in the resin tank is used as the exposure plane.

The build-platform driver control signal line 52, the optical engine control signal line 49, and the reflection mirror control signal line 48 include a data bus, an address bus, and/or a control bus.

A user interface 60 is connected to the controller 50. On the screen of the user interface 60, a first button 62, a second button 64, etc. are displayed, and pressed or controlled by an operator of the 3D printer 100.

The user interface 60 may display a pattern in which the screens split by the screen splitter 44 are formed as one large-scale screen 47. Actually, one large-scale screen 47 is formed by sequential exposure with time differences on the build platform 20 or the exposure plane of the resin tank 30. However, for convenience, descriptions will be made without the time difference.

The pattern, in which the screens split by the screen splitter 44 are configured as one large-scale screen, may be displayed and calibrated in a separate test room through a calibration mode during production of the large-scale screen exposure system 40.

Likewise, the calibration may be performed while the large-scale screen exposure system 40 is assembled into the 3D printer 100.

Figure 2:
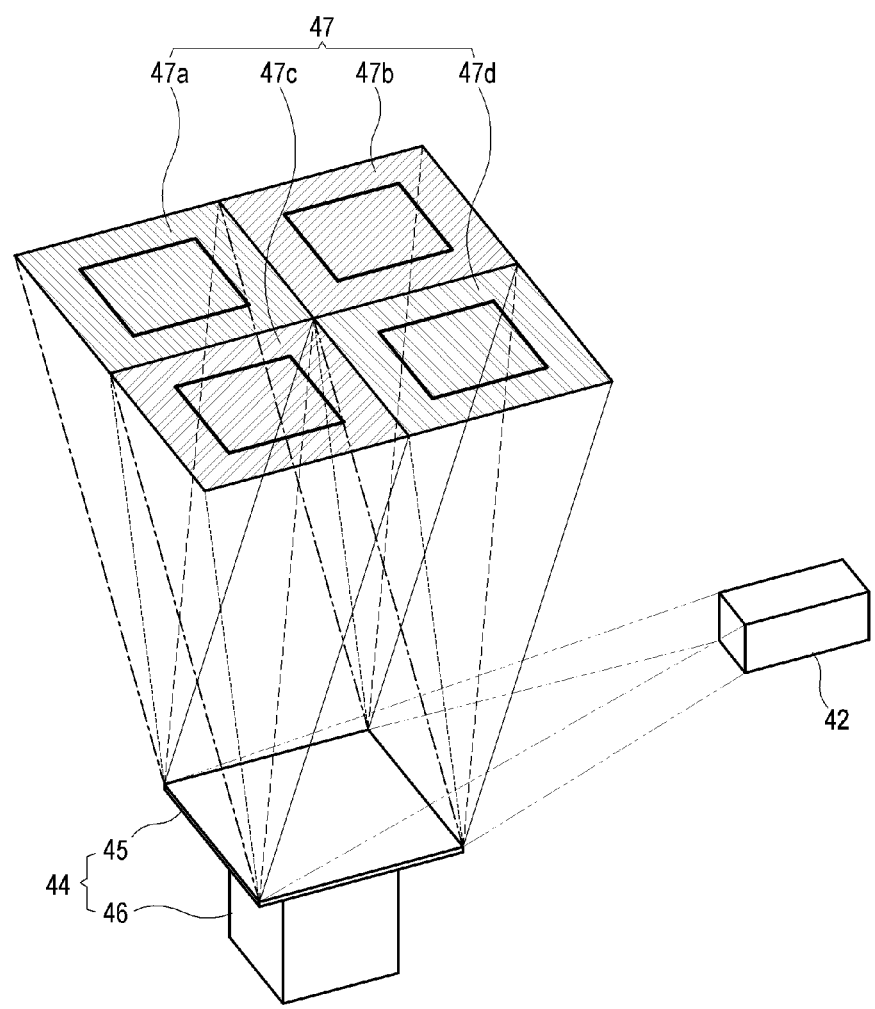
FIG. 2 is a conceptual perspective view of the large-scale screen exposure system, in which a single optical engine is used to combine a plurality of split screens into one large-scale screen with time differences.

FIG. 2 is a conceptual perspective view of the large-scale screen exposure system, in which a single optical engine is used to combine a plurality of split screens into one large-scale screen with time differences.

For example, FIG. 2 illustrates that the large-scale screen exposure image is split into four screens by the single optical engine 42.

At the first timing, the single optical engine 42 splits an image corresponding to a first unit cross-sectional area from a shape image of a sculpture into four unit images, and projects the first split image among the four unit images toward a reflection mirror 45 of the screen splitter 44. The reflection mirror 45 reflects the received exposure image and thus projects the first split image on to a first split screen 47a of the exposure plane in response to an operation of the reflection mirror driver 46.

At the next timing, the single optical engine 42 projects the second split image among the four split images of the first unit cross-sectional area toward the reflection mirror 45 of the screen splitter 44. The reflection mirror 45 is adjusted to turn toward the second split screen in response to an operation of the reflection mirror driver 46, thereby reflecting the received second exposure image and projecting the second split image to a second split screen 47b of the exposure plane.

Then, at the third timing and the fourth timing, screens corresponding to a third split screen 47c and a fourth split screen 47d are projected, and thus time differential exposure is performed with regard to the large-scale screen 47.

Meanwhile, such exposure of the first to fourth split screens is repeated several times. Then, the split and the exposure are performed with regard to the next unit image. This is to cure the first split screen and the fourth split screen at the same time.

FIGS. 3A to 3D are conceptual views of screen states illustrating that a plurality of split screens are controlled to be combined into one large-scale screen according to the present invention.

First, at a first step, a plurality of beam projection images to be subjected to time differential exposure, which are split by the single optical engine 42, are initially combined into one large-scale screen. A first split screen 47a, a second split screen 47b, a third split screen 47c and a fourth split screen 47d are distorted. The distortion may be different according to the screens.

At a second step, the plurality of distorted split screens 47a-47d are adjusted to have quadrangular shapes. For such adjustment, the optical engine 42 may be controlled by a keystone adjustment button.

At a third step, the plurality of split screens are adjusted to be overlapped with one another. For the overlap adjustment, parallel transfer of a displayed position may be performed by changing a reference point of the optical engine.

In the drawing, the overlapped area includes a first overlapped area 47e, a second overlapped area 47f, a third overlapped area 47g, a fourth overlapped area 47h and a fifth overlapped area 47i. Among them, the first to fourth overlapped areas 47e to 47h have a double overlap, and the fifth overlapped area 47i has a quadruple overlap.

At a fourth step, the overlapped areas 47e, 47f, 47g, 47h and 47i are subjected to exposure control for preventing excessive exposure of the overlapped areas, so that exposure can be uniform between the overlapped areas and the non-overlapped areas.

There may be a difference in intensity of exposure light energy between the overlapped area and the non-overlapped area. Such a difference in the exposure light intensity has to be revised to thereby minimize non-uniformity in building.

As a representative method of revising the difference in the exposure light intensity for the overlapped areas, there is a method of adjusting exposure brightness. For example, when an exposure brightness level of '100' is given for the non-overlapped area, the exposure brightness level is reduced by 50% and then applied to the overlapped areas 47e, 47f, 47g and 47h corresponding to the double overlap. Further, a 25% exposure brightness level is applied to the overlapped area 47i corresponding to the quadruple overlap. Therefore, the areas corresponding to the double overlap is subjected to the exposure light intensity of 100%. The area corresponding to the quadruple overlap is also subjected to the exposure light intensity of 100%. In this case, the exposure light intensity such as 50% and 25% may be adjusted as an accumulation of the exposure light intensity is calculated.

Besides, there may be a method of variously changing the exposure brightness according to the overlapped areas. In this case, an overlapped area in one of two split images overlapped among the plurality of split images may be controlled to have a brightness level (almost black level) significantly lower than a reference brightness level.

Thus, the entire area of the large-scale screen 47 is exposed by uniform light intensity without excessive exposure.

Figure 4:
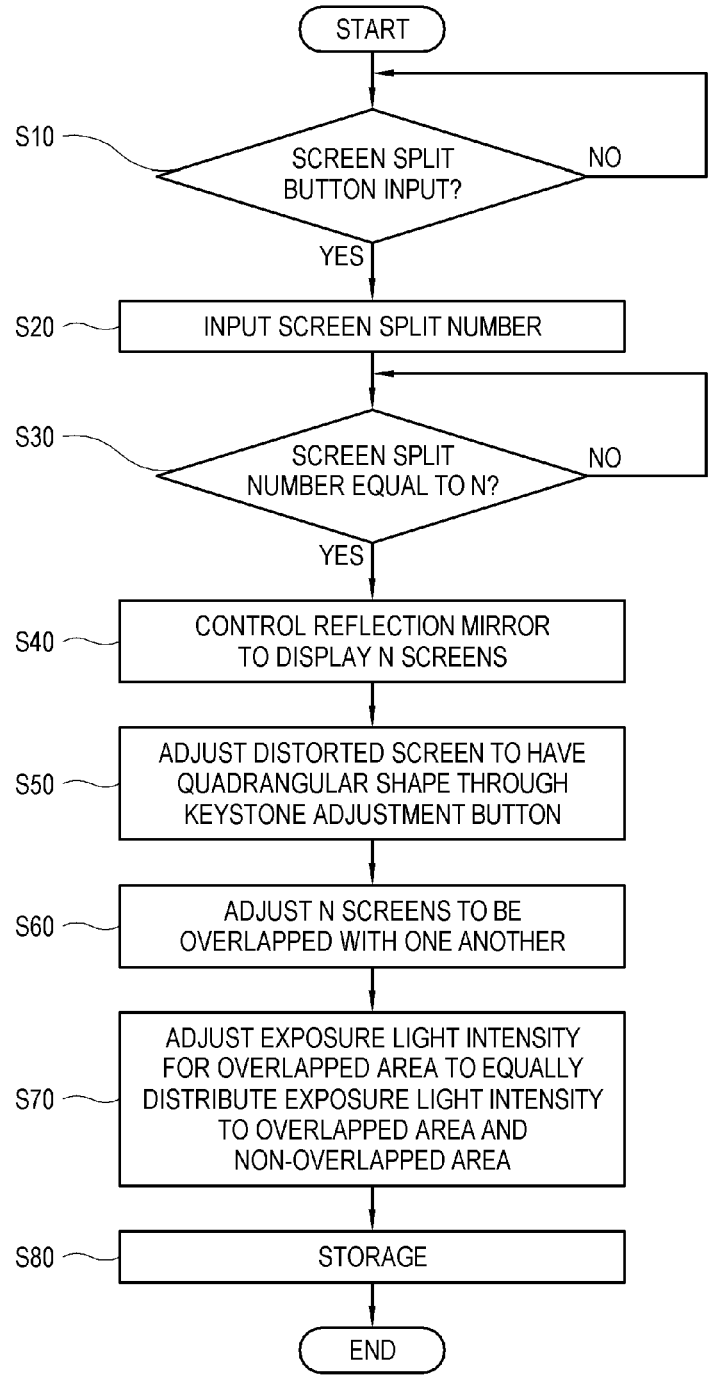
FIG. 4 is a flowchart illustrating a process of combining a plurality of split screens into one large-scale screen according to the present invention.

FIG. 4 is a flowchart illustrating a process of combining a plurality of split screens into one large-scale screen according to the present invention.

The first button 62 provided in the user interface 60 is pressed to enter a screen split mode. The depression of the first button 62 is monitored (S10). The first button 62 corresponds to a screen split button.

A screen split number is input (S20). The screen split number corresponds to a natural number such as '2', '3', '4', and so on. In the embodiment shown in FIGS. 3A to 3D, a screen split number of '4' is input, and thus four split screens are combined into one large-scale screen.

It is determined whether the screen split number is n (S30). Where, n is a natural number of '2', '3', '4', and so on. In the embodiment of FIGS. 3A to 3D, n is '4' by way of example.

The reflection mirror 45 of the screen splitter 44 is controlled to apply time differential exposure to n screens on the exposure plane (S40). The display of the screens refers to emission of building light to the exposure plane under the build platform 20.

Figure 3A:
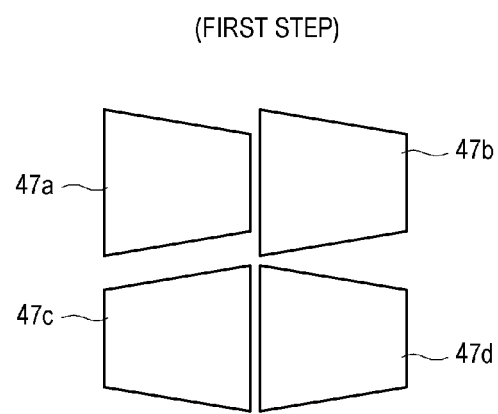
FIGS. 3A to 3D are conceptual views of screen states illustrating that a plurality of split screens are controlled to be combined into one large-scale screen according to the present invention.
Figure 3B:
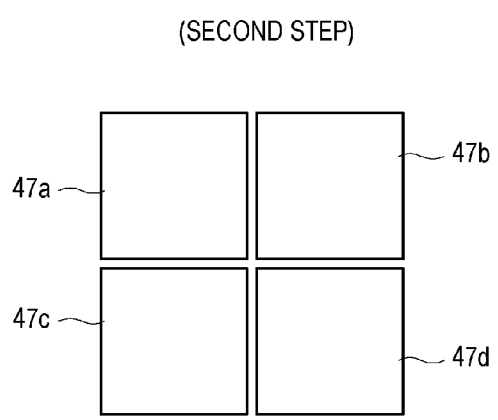
Figure 3C:
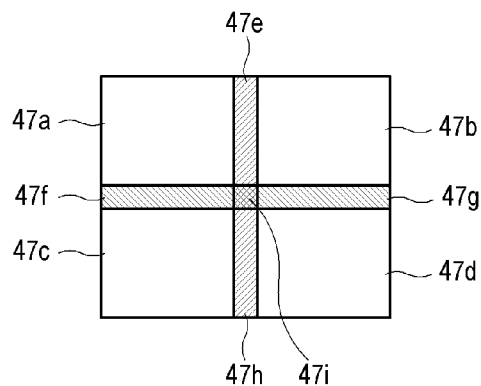
Figure 3D:
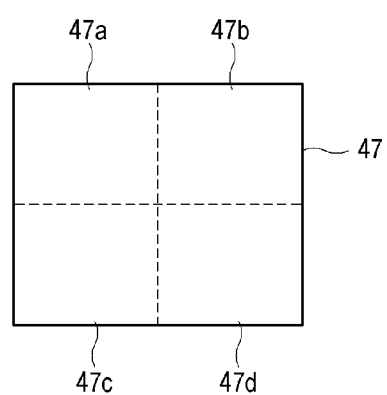

Like the pattern shown in the first step of FIG. 3A, the screens made by the operation of the reflection mirror 45 may have a distortion, and the distortion may be adjusted to have a quadrangular shape by the keystone adjustment button (S50).

N screens are adjusted to overlap with one another (S60). For the overlap adjustment, parallel transfer of a displayed position may be performed by changing a reference point of the optical engine.

The exposure light intensity for the overlapped areas is adjusted to have a brightness level lower than a reference brightness level, so that the exposure light intensity can be equally distributed to the overlapped area and the non-overlapped area (S70). The areas corresponding to the double overlap may be subjected to 50% of the reference brightness level. The areas corresponding to the quadruple overlap may be subjected to 25% of the reference brightness level.

The levels adjusted in the previous operation are stored (S80). The controller 50 stores parameters for the adjusted levels in its built-in memory or a memory of the 3D printer.

Therefore, parameters about the split into four screens (where, 'four' is given by way of example), the distortion adjustment, the overlap adjustment, and the adjustment in brightness level between the overlapped area and the non-overlapped area are stored once, and then the stored parameters are loaded when only a number for splitting the screens is input, thereby being automatically ready for large-scale screen building.

A method of building the large-scale sculpture 2 according to the present invention is as follows. The large-scale screen exposure system 40 uses the single optical engine 42 to split an image corresponding to a kind of unit cross-sectional area and performs time differential exposure with regard to the respective split screens 47a-47d.

Specifically, the first split screen 47a is exposed with the first split image for a first time. When the first time elapses, the exposure is stopped and the reflection mirror driver 46 operates to do adjustment for a second time so that the reflection mirror 45 can turn toward the second split screen.

The optical engine 42 makes the second split image be subjected to the exposure for the first time, and the reflection mirror 45 reflects the exposure image toward the second split screen.

In this manner, a first round exposure of the first unit cross-sectional area is completed by using the third to fourth split screens in sequence.

When the first round exposure corresponding to the first unit cross-sectional area is completed, the foregoing operations are repeated several times to thereby complete the exposure of the first unit cross-sectional area.

For example, when 6 seconds are given for the exposure of each unit image, the exposure may be performed by three rounds with 2 seconds per round. The given rounds and times are merely an example, and the present invention is not limited to these numerical values.

If the exposure time of 6 seconds is fully applied to each of the first to fourth split areas to be sequentially subjected to the exposure interference between adjacent areas makes it difficult to get uniform quality since the second split area is subjected to the exposure after the first split area is cured by the exposure for 6 seconds. In this case, quality problems are caused by time differential curing based on the unit area exposure.

Accordingly, the exposure is performed several times by dividing a total curing time, so that the first split area 47a and the fourth split area 47d can be evenly cured at the time of final round of exposures.

The controller 50 controls the build platform driver 10 and 70 to drive the build platform to move up or down for forming the next unit image.

By a stack formed in this manner, the large-scale sculpture 2 is completely built.

Figure 5A:
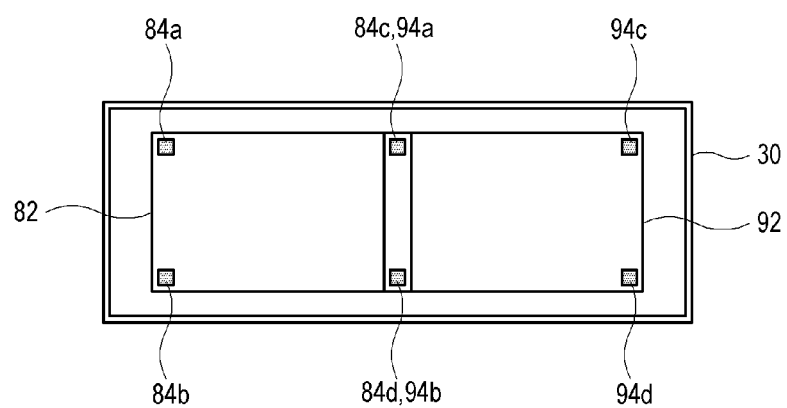
FIGS. 5A and 5B are conceptual views illustrating that two optical engines are used to configure a large-scale screen exposure system according to another embodiment of the present invention.
Figure 5B:
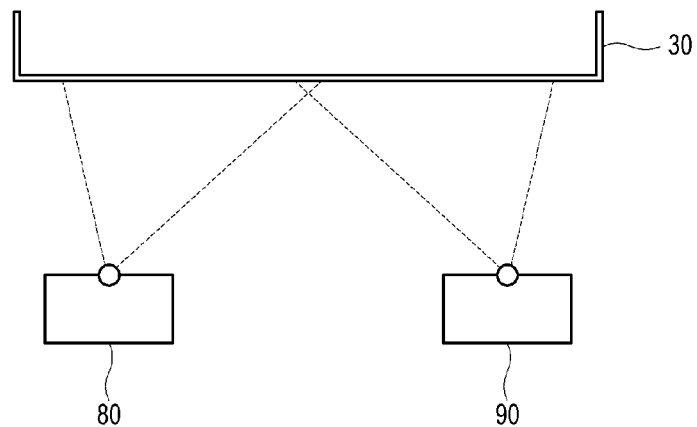

FIGS. 5A and 5B are conceptual views illustrating that two optical engines are used to configure a large-scale screen exposure system according to another embodiment of the present invention.

FIGS. 5A and 5B show a method of overlapping split exposure areas by the plurality of engines. In FIG. 5A is a plan view, and FIG. 5B is a front view.

A first optical engine 80 performs exposure with regard to only first overlap marking portions 84a, 84b, 84c and 84d corresponding to four corners for exposure covering a first exposure area 82 and suitable overlap of the exposure area of the optical engine 80.

A second optical engine 90 performs exposure with regard to only second overlap marking portions 94a, 94b, 94c and 94d corresponding to four corners for exposure covering a second exposure area 92 and suitable overlap of the exposure area of the optical engine 90.

When the right overlap marking portions 84c and 84d of the first overlap marking portions are aligned with the left overlap marking portion 94a and 94b of the second overlap marking portion, the first exposure area and the second exposure area are overlapped with each other.

Therefore, the first exposure area and the second exposure area are exactly overlapped to thereby prevent misalignment and distortion of the split images.

The first overlap marking portion and the second overlap marking portion may be provided as a quadrangular shape, a circular shape, or a linear type, but not limited thereto. Alternatively, workshop modification may be properly made for the purpose of accurate arrangement of each exposure area.

Further, the plurality of engines may project not only one large-scale screen by splitting one large-scale screen according to exposure areas, but also multi screens by selectively matching with independent screens.

Further, the plurality of engines may not only perform the exposure at the same time, but also selectively perform the exposure with time differences. With this, it is effective to minimize heat generated when a large-scale exposure area is subjected to the exposure.

Furthermore, compressive stress (release stress) between a building surface and a bottom of a resin tank, which is applied in a releasing process, is decreased as much as possible since building is partially performed with regard to a cured area of one layer. As the stress is decreased, surface roughness becomes better.

Figure 6A:
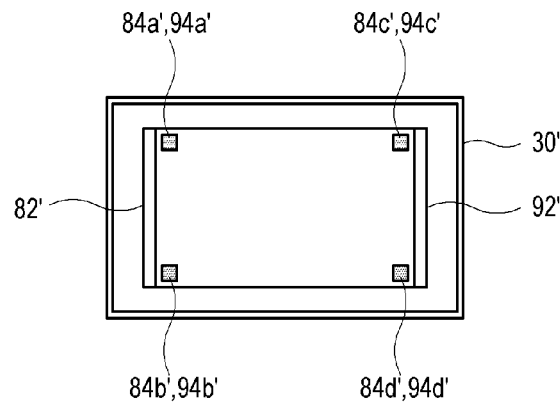
FIGS. 6A and 6B are conceptual views illustrating that two optical engines are used to configure an overlapping exposure system according to still another embodiment of the present invention.
Figure 6B:
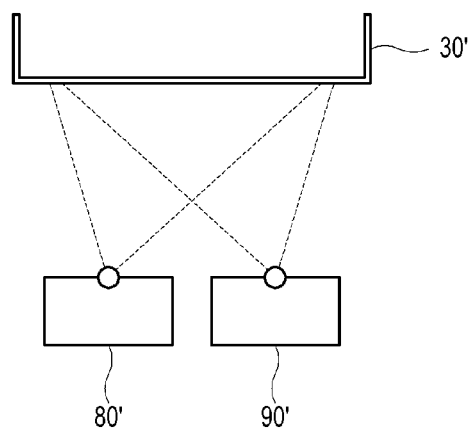

FIGS. 6A and 6B are conceptual views illustrating that two optical engines are used to configure an overlapping exposure system according to still another embodiment of the present invention.

A first optical engine 80' performs exposure with regard to only first 1 overlap marking portions 84a', 84b', 84c', 84d' corresponding to four corners for exposure covering a first exposure area 82' and suitable overlap of the exposure area of the optical engine 80'.

A second optical engine 90' performs exposure with regard to only second overlap marking portions 94a', 94b', 94c' and 94d' corresponding to four corners for exposure covering a second exposure area 92' and suitable overlap of the exposure area of the optical engine 90'.

When all the first overlap marking portions 84a', 84b', 84c' and 84d' and all the second overlap marking portions 94a', 94b', 94c' and 94d' are overlapped in order to overlap the first optical engine 80' and the second optical engine 90' with each other, the corresponding overlap marking portions are aligned with each other.

The present invention includes a case where two optical engines 80' and 90' are positioned to have their exposure areas 82' and 92' fully overlapped, and a case where two optical engines are positioned to have their exposure areas 82' and 92' overlapped with slight misalignments to each other.

When the exposure areas 82' and 92' are overlapped with slight misalignments to each other, it is effective to improve a resolution.

According to still another embodiment of the present invention, two optical engines 80' and 90' are positioned to have their exposure areas 82' and 92' minutely overlapped to thereby get an output surface having an enhanced resolution, which is about twice as precise as the case of using the single optical engine.

According to yet another embodiment of the present invention, two optical engines 80' and 90' are positioned to have their exposure areas 82' and 92' overlapped with each other to thereby get optical energy, which is almost doubled as compared with the case of using the single optical engine.

The present invention is not limited to the embodiments described above, but characterized in that one optical engine is used to make a plurality of split screens be sequentially subjected to exposure according to the concept of the present invention.

The present invention is applicable to a DLP printer and the like industry.

What is claimed is:

1. A 3D printer comprising:
   a resin tank filled with liquid resin;
   a build platform configured to be immersed in the resin tank or positioned adjacent to the resin tank to form a building plane on the build platform, and have the liquid resin in the resin tank cured by light exposure and stacked on the building plane;
   a build-platform driver configured to drive the build platform to move up and down;
   an exposure system configured to project an image beam toward the building plane and comprising a plurality of optical engines and a plurality of reflection mirrors corresponding to the plurality of optical engines, the plurality of reflection mirrors reflecting a plurality of split image beams projected by the plurality of optical engines; and
   a controller configured to split a layering unit image based on a shape information about a three-dimensional building object to generate a plurality of split images overlapped with one another, and configured to control the plurality of optical engines to project the plurality of split image beams corresponding to the plurality of split images with time differences to build the three-dimensional object stacked on the building plane,
   wherein the controller is further configured to control the plurality of optical engines to project the plurality of split image beams to be overlapped partially to one another by adjusting the plurality of reflection mirrors, and to project the plurality of split image beams sequentially for a number of exposures required to stack one layer of the layering unit image such that each split image in the one layer is exposed a plurality of times, wherein the one layer of the layering unit image comprises the plurality of split images, the plurality of split images is all sequentially exposed in one cycle, and the exposure of the one layer of the layering unit image is performed in multiple cycles.

2. The 3D printer according to claim 1, wherein the controller is configured to set the time differences in exposing the plurality of split image beams by dividing a total exposure time of the layering unit image with the number of exposures.

3. The 3D printer according to claim 1, wherein
the exposure system further comprises a reflection mirror driver,
the plurality of optical engines receive the plurality of split images from the controller and,
the plurality of reflection mirrors reflect the plurality of split image beams of the plurality of optical engines,
the controller transmits a control signal corresponding to the plurality of split images to the reflection mirror driver,
the reflection mirror driver changes a reflection position of the plurality of reflection mirrors into a plurality of different positions in response to the control signal, so that the plurality of split image beams reflected from the plurality of reflection mirrors are projected as the image beam to the building plane by the plurality of time-differential split screens.

4. The 3D printer according to claim 3, wherein the controller adjusts a distortion of the plurality of split screens, makes the plurality of split screens projected on the building plane be partially overlapped with one another, and provides the plurality of split images to the plurality of optical engines after adjusting a brightness level for an overlapped area to be lower than a brightness level for a non-overlapped area in the plurality of split screens.

5. The 3D printer according to claim 1, wherein the controller controls the plurality of optical engines to adjust an overlapped extent of the plurality of split image beams of the optical engines.

6. The 3D printer according to claim 5, wherein the controller controls to have the plurality of split image beams of the plurality of optical engines overlapped with slight misalignments to one another.

* * * * *